United States Patent [19]

Graebner et al.

[11] Patent Number: 5,500,157

[45] Date of Patent: Mar. 19, 1996

[54] METHOD OF SHAPING POLYCRYSTALLINE DIAMOND

[75] Inventors: John E. Graebner, New York, N.Y.; Sungho Jin, Millington; Raymond Wolfe, New Providence, both of N.J.

[73] Assignee: AT&T Corp., Murray Hill, N.J.

[21] Appl. No.: 368,581

[22] Filed: Jan. 4, 1995

Related U.S. Application Data

[63] Continuation of Ser. No. 38,370, Mar. 29, 1993, abandoned.

[51] Int. Cl.⁶ .................................................. B29D 11/00
[52] U.S. Cl. ............................................ 264/1.21; 264/293
[58] Field of Search .............................. 264/1.21, 293; 156/625, 628

[56] References Cited

U.S. PATENT DOCUMENTS

| | | | |
|---|---|---|---|
| 4,339,304 | 7/1982 | Grigoriev et al. | 156/635 |
| 4,737,248 | 4/1988 | Nakamura et al. | 204/71 |
| 5,035,771 | 7/1991 | Borse | 156/646 |

FOREIGN PATENT DOCUMENTS

| | | | |
|---|---|---|---|
| 2061904 | 5/1981 | United Kingdom | B24B 9/16 |

OTHER PUBLICATIONS

Jin et al., *App Phys Lett* vol. 60(16), Apr. 20, 1992 p. 1948.
"Massive thinning of diamond films by a diffusion process", by S. Jin et al., *Applied Physics Letters*, vol. 60(16), Apr. 20, 1992, p. 1948.
"Polishing of CVD diamond by diffusional reaction with manganese powder", by S. Jin et al., *Diamond and Related Materials*, vol. 1, (1992), pp. 949–953.

*Primary Examiner*—Christopher A. Fiorilla
*Attorney, Agent, or Firm*—Eugen E. Pacher

[57] ABSTRACT

A technique that involves selective removal of material from a surface of a polycrystalline diamond (polyD) film such that a non-planar surface results. Exemplarily the technique is used to form polyD optical elements, e.g., convex or concave lenses, or Fresnel lenses, including arrays of such lenses. The technique involves maintaining on appropriately shaped hot template body in intimate contact with a polyD surface for a time (e.g., in the range 1–1000 hours) sufficient to result in formation of the desired feature in the polyD surface. The template body involves a rare earth metal (La and Ce are preferred), Mn and/or Fe, and the temperature is below the melting temperature of the template body. Removal of "spent" template material by, e.g., chemical etching and finishing of the polyD feature, e.g., by laser ablation and/or polishing, are contemplated.

6 Claims, 4 Drawing Sheets

METHOD OF SHAPING POLYCRYSTALLINE DIAMOND

This application is a continuation of application Ser. No. 08/038,370, filed on Mar. 29, 1993, now abandoned.

FIELD OF THE INVENTION

This invention pertains to polycrystalline diamond (herein polyD) film, and to methods of shaping the film.

BACKGROUND OF THE INVENTION

PolyD films, typically prepared by chemical vapor deposition (CVD), have received considerable attention in recent years, because of their remarkable properties. These include high thermal conductivity, optical transparency, high refractive index, mechanical hardness and chemical inertness.

It is known that the hardness of diamond is strongly dependent on crystal orientation, so that a soft diamond crystal plane can be abraded by a hard crystal plane. This fact is used in conventional diamond polishing, which involves removal of material from soft crystal planes by means of (randomly oriented) diamond powder.

PolyD film comprises many crystallites, and there will always be present crystallites that have one of their hard directions approximately oriented in the removal direction, and thus cannot be removed easily by conventional means. It is principally for this reason that removal of material from polyD films has been problematical.

Commonly assigned U.S. patent application Ser. No. 07/822,470, filed Jan. 17, 1992 now abandoned for J. E. Graebner et al., discloses a method of removing material from a polyD film that comprises maintaining the film in intimate contact with Fe, Ni, Mn or Ti at 600°–1100° C. See also S. Jin et al., *Applied Physics Letters,* Vol. 60, p. 1948 (1992), and S. Jin et al., *Diamond Films and Related Materials,* Vol. 1, p. 949 (1992). The required intimate contact typically is attained through application of pressure during the high temperature treatment. Commonly assigned U.S. patent application Ser. No. 07/908,130, filed Jul. 2, 1992 for W. C. Dautremont-Smith et al., discloses thinning of polyD film by contacting the film with molten or partially molten metal that dissolves carbon, exemplarily a rare earth (e.g., La or Ce) or mixture of rare earths. It also discloses that portions of a surface of the polyD film can be protected by masks against the liquid metal. See also commonly assigned U.S. patent application Ser. No. 07/955,634 now U.S. Pat. No. 5,328,550, filed Oct. 2, 1992 for J. E. Graebner et al., which discloses use of a molten or partially molten alloy of a rare earth metal (e.g., Cc) and a melting point-lowering metal, e.g., Ni, permitting a drastic reduction in thinning temperature, as compared to the method of the '130 application.

U.K. Patent application GB 2,061,904A discloses shaping a diamond body (not polyD) by contacting the body with an appropriately shaped metal (preferably Fe, Ni, Pt or alloys thereof) "template" at a temperature in the range 600°–1800° C. in vacuum, inert gas atmosphere, or in an atmosphere which does not react with diamond but reacts with carbon dissolved in the metal.

In view of the remarkable properties of diamond, it would be highly desirable to have available a technique for shaping polyD material into non-planar (e.g., lenticular) shape. Such a technique could, for instance, be used to produce optical elements (e.g., lenses, arrays of microlenses) or mechanical elements (e.g., wires, needles) from polyD material. This application discloses such a technique.

GLOSSARY AND DEFINITIONS

By a "planar" surface of the precursor polyD film we mean a surface that at most has only the, typically unavoidable, microscopic irregularities found in as-grown polyD films, but does not have any macroscopic non-planar features.

By a "non-planar" surface we mean a surface that comprises one or more macroscopic (at least one lateral dimension typically greater than 100 μm) features that extend above or below the nominal surface of the body. The nominal surface is the planar portion of the non-planar surface.

A feature in or on a non-planar polyD surface is a "substantial replica" of a feature in a template body if the shape and size of the feature, in or on the polyD surface, substantially correspond to the shape and relevant size of the feature in the template body. One-to-one correspondence typically will not be attained, requiring pre-determination of template feature shape and size that will result in the desired polyD feature shape and size. This can typically be accomplished by a minor amount of routine experimentation. It will be recognized that typically a convex (concave) template feature corresponds to a concave (convex) polyD feature.

SUMMARY OF THE INVENTION

In a broad aspect, the invention is embodied in a method of making an article that comprises a polyD film having a non-planar surface, e.g., a surface that comprises one or more lenticular (convex or concave) portions.

More specifically, the method comprises providing a precursor diamond body that has a substantially planar surface, and forming the desired diamond body from the precursor body by a process that comprises removing diamond material from the precursor body by contacting said surface of the precursor body with a hot template. Significantly, the precursor body is a polyD film, and the template comprises a template body that comprises a metal selected from the group consisting of the rare earth metals (atomic number 57–71), Mn and Fe. The template body will typically contain at least 20 (preferably at least 50) atomic percent of rare earth metal, Mn and/or Fe. The preferred rare earth metals are Ce and La. The template body has a non-planar surface and is maintained, during said contacting step, at a temperature (or temperatures) below (preferably at least 20° C. below) the melting temperature of said template body. The method further comprises maintaining the template body in intimate contact with at least a portion of said surface of the precursor body for a time (exemplarily in the range 1–1000 hours) effective for transforming said substantially planar surface of the precursor body into a non-planar surface that comprises a substantial replica of said non-planar surface of the template body. The replica typically, but not necessarily, is a negative one. Further processing (e.g., smoothing by laser ablation or other known method) of the feature in/on the polyD surface may be appropriate and is contemplated. The heat treatment preferably is carried out in an inert or reducing atmosphere, e.g., in Ar, He, $N_2$ or $H_2$. At least in some cases (e.g., if the melting point of the template body changes with the amount of dissolved carbon in the body) it may be advantageous to appropriately change the temperature during the course of the heat treatment, so that melting (or excessive softening) of the template body is avoided, and so that a relatively high reaction ram is maintained.

No attempt has been made to accurately depict sizes and proportions.

DETAILED DESCRIPTION OF SOME EXEMPLARY EMBODIMENTS

Figure 1:
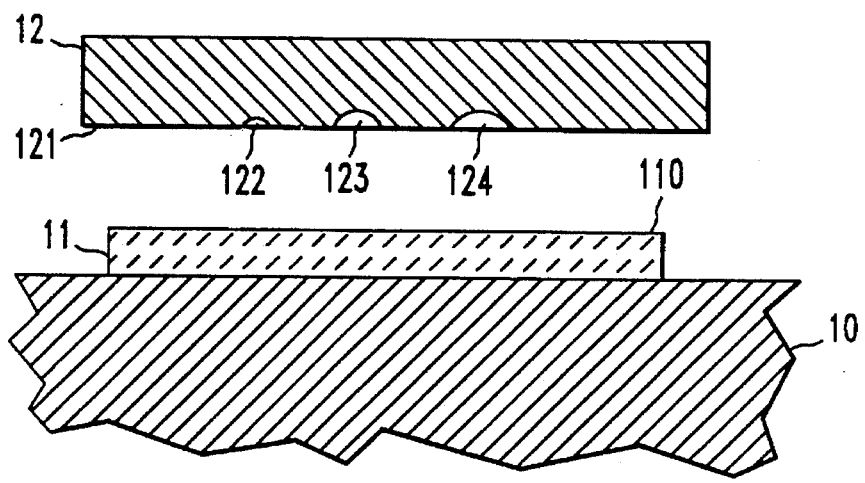
FIGS. 1–4 schematically depict steps in an exemplary process according to the invention that result in formation of a non-planar polyD surface that comprises convex features protruding above the nominal surface.
Figure 2:
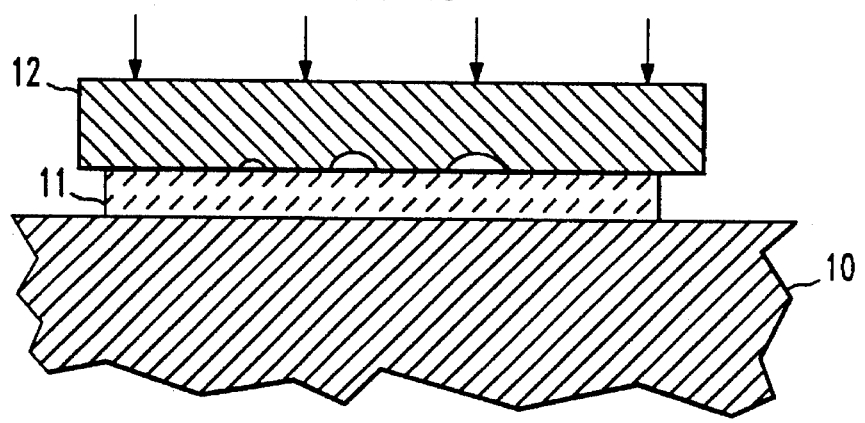
Figure 3:
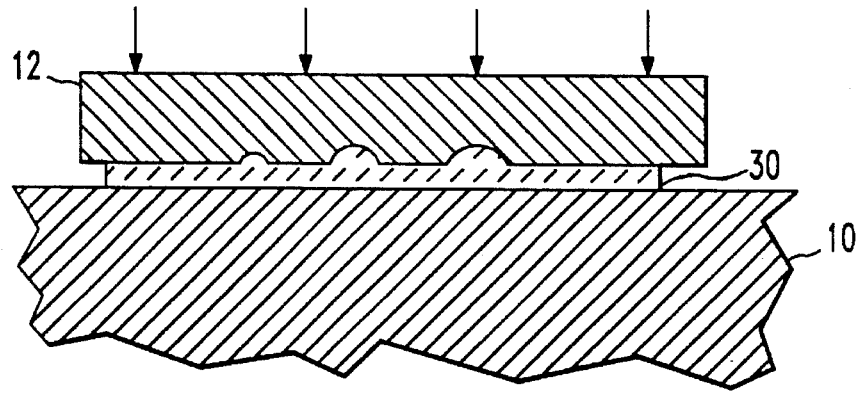
Figure 4:
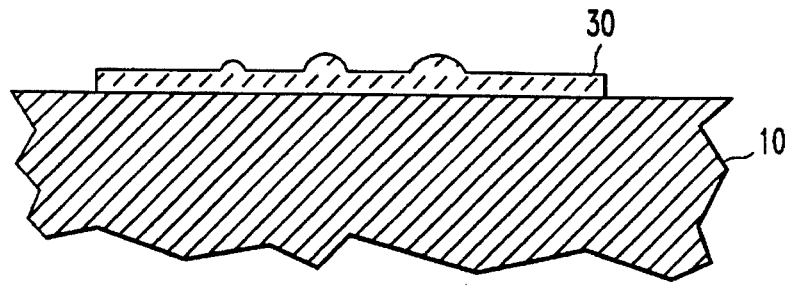

FIGS. 1–4 schematically depict aspects of the inventive method. Numeral 10 designates an optional substrate, 11 a (planar) polyD precursor body, and 12 a template body that comprises a non-planar surface facing the polyD film, with the surface having concave features 122, 123 and 124 and a planar portion 121. FIG. 1 depicts the arrangement before the template body is brought into contact with the precursor body, FIG. 2 shows the template body in intimate contact with the precursor body (intimate contact exemplarily is achieved by means of applied force, indicated by arrows), FIG. 3 shows the arrangement just prior to completion of material removal from the polyD film (numeral 30 refers to the polyD body formed from the precursor body by selective removal of material), and FIG. 4 shows the thus produced polyD body after removal of carbon-containing template material by etching. It will be understood that in all the figures the interface between the polyD body (e.g., 11, 50) and the template body (e.g., 12, 51, 52) corresponds to the interface between essentially pure polyD and metal (e.g., Ce)-containing material (e.g., substantially pure Ce in FIG. 2, and C-containing Ce in FIGS. 3 and 6).

Figure 5:
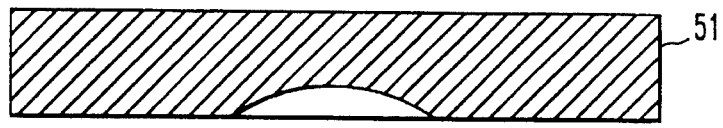
FIGS. 5–6 schematically illustrate another embodiment of the invention, namely, formation of a double convex feature in a free-standing polyD film.
Figure 5:
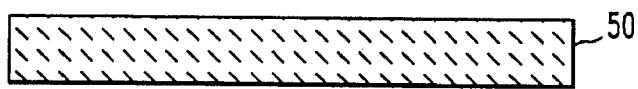
Figure 6:
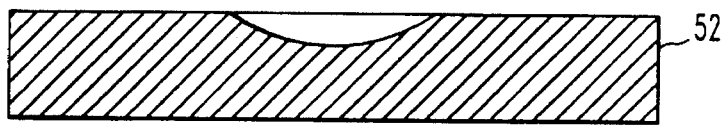
Figure 6:
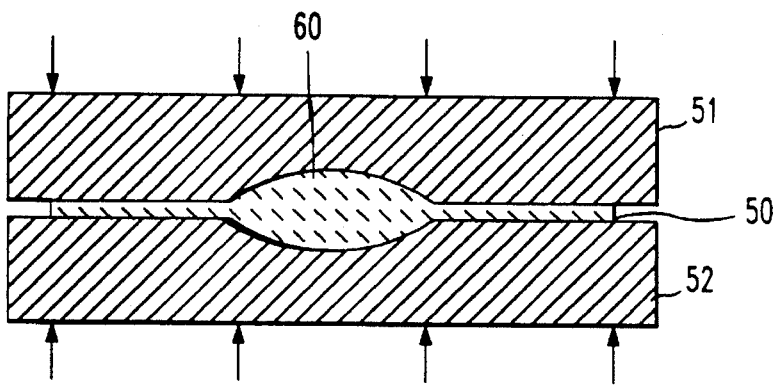

FIGS. 5 and 6 schematically depict another exemplary embodiment of the invention, wherein numeral 50 refers to a freestanding polyD precursor body, 51 and 52 to template bodies, and 60 to the resulting polyD body just prior to completion of the selective removal of diamond material.

Figure 7:
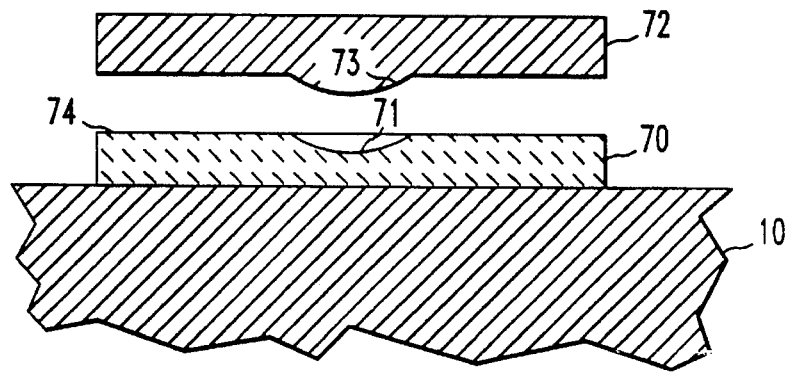
FIG. 7 schematically illustrates still another embodiment which involves formation of a concave depression in a polyD film.

As those skilled in the art will recognize, the inventive method can be used to form concave as well as convex features on a polyD film, and FIG. 7 schematically depicts a polyD body 70 that comprises a concave feature 71, that extends below the "nominal" surface 74 and also depicts template body 72 having a non-planar surface that comprises convex feature 73.

FIGS. 1–7 illustrate formation of non-planar surfaces that comprise features (concave or convex) that substantially are replicas of the non-planar portion of the template body in contact with the polyD surface.

Figure 8:
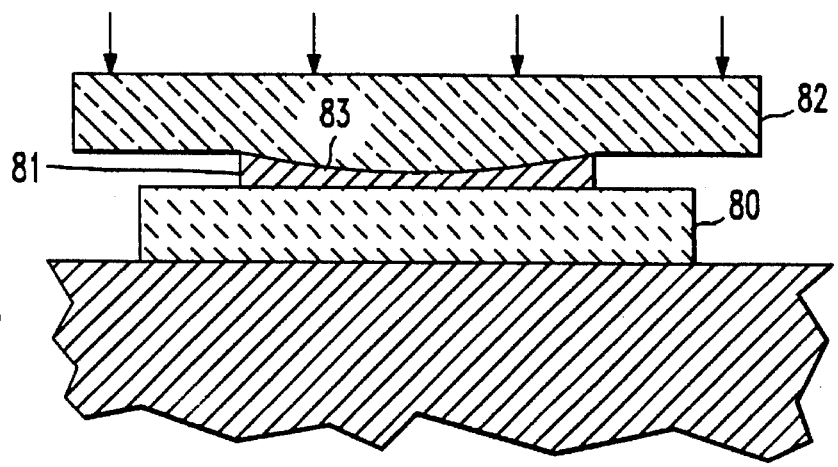
FIGS. 8–9 and 10–12 schematically depict further embodiments of the invention.
Figure 9:
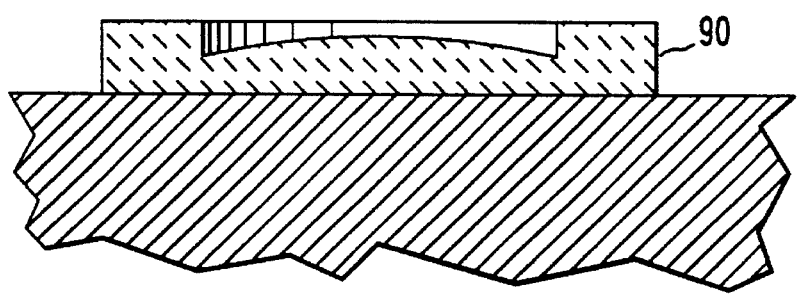

FIGS. 8 and 9 schematically illustrate an embodiment of the invention that can result in formation of a substantial replica of a non-planar feature that is not in contact with the polyD surface. In FIG. 8, numeral 80 refers to the polyD precursor body, and 81 to the template body, in intimate contact with the precursor body. Body 82 serves to transmit an applied force to the template body. Typically it comprises (or consists of) non-reactive material in contact with the template body. Exemplarily such material is $Al_2O_3$ for Mn or Fe, and Mo for La and Ce.

FIG. 9 schematically shows the resulting polyD body 90. The substantial replica of the convex feature in the non-planar surface of the template body is formed by a mechanism that relies on the fact that the total amount of diamond that can be removed at a given point of the polyD film will typically depend on the thickness of the template body at the given point.

Thus, this approach to shaping of a polyD body will be most effective if the normalized thickness difference (i.e., $(t_{max}-t_{min})/t_{min}$) across the template body is relatively large, typically at least 1, preferable greater than 2 or even 5. In the above expression, $t_{max}$ and $t_{min}$ are, respectively, the relevant maximum and minimum thickness of the template body.

Figure 10:
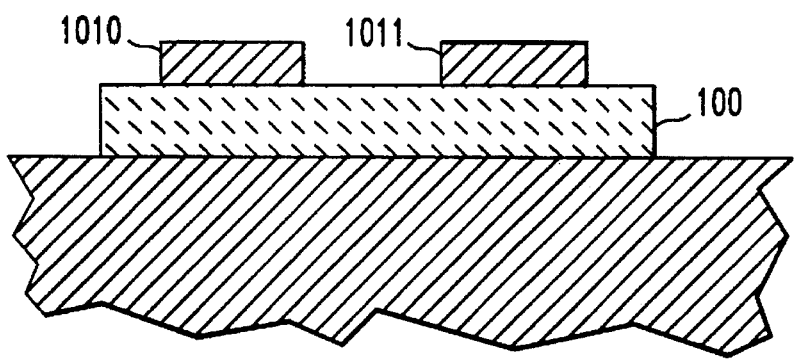
Figure 11:
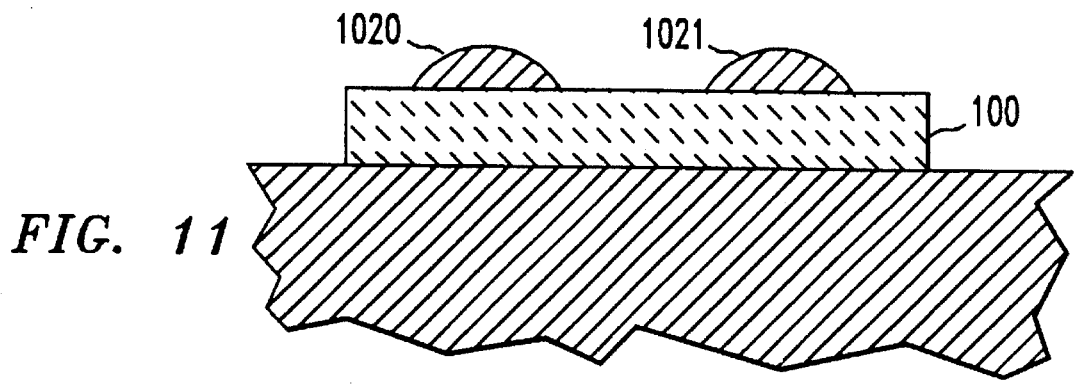
Figure 12:
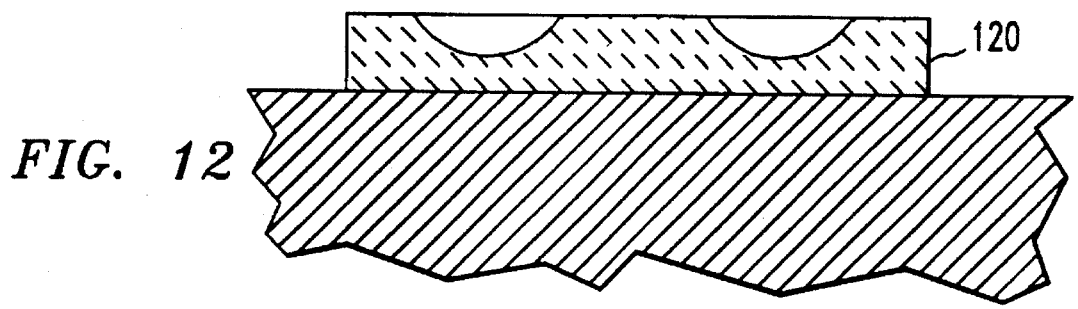

FIGS. 10—12 schematically show a further embodiment of the inventive method that also can produce a substantial replica. On polyD precursor body 100 is deposited and patterned a metal (e.g., Ce) layer, with uniform-thickness metal bodies 1010 and 1011 remaining on the polyD surface. By known means (e.g., controlled chemical etching) the uniform-thickness bodies are shaped as desired, resulting in template bodies 1020 and 1021. FIG. 12 shows the resulting polyD body 120 with non-planar surface, after removal of the "spent" template bodies.

Although preferred embodiments of the invention form optical elements (e.g., conventional lenticular elements as shown in FIGS. 1–12, or Fresnel lenses), the inventive process is not so limited, and we contemplate manufacture of a wide variety of polyD bodies with one or more non-planar surfaces. Such bodies may find use, for instance, for biomedical applications such as prosthetic implants, due to the great inertness of diamond and its high biocompatibility.

The inventive method is advantageously used for making polyD optical elements. As is well known, diamond (including polyD) has an exceptionally large refractive index, namely, about 2.4. Thus, powerful refractive optical elements such as lenses can have relatively modest curvature. Furthermore, polyD diamond lenses are expected to be far more resistant to damage by high-power laser beams than conventional lenses, due to the strong atomic bonding, very high thermal conductivity and very low thermal expansion coefficient of diamond. Thus, we contemplate use of optical polyD elements (including lenses, arrays of lenses and Fresnel lenses) inter alia in articles that comprise high-power lasers.

It will be appreciated that, upon completion of the heat treatment, the non-planar polyD surface will typically be covered with C-containing template material (e.g., Ce-carbide). This "spent" template material can be readily removed by means of, e.g., chemical etching.

EXAMPLE 1

In a Ce sheet (about 5 mm×5 mm×0.25 mm) a non-planar surface was created by indentation with a steel sphere (diameter about 1.57 mm), followed by polishing of the surface with emery paper. By this technique two, about 0.15 mm deep, indentations, with about 0.785 mm radius of curvature, were formed in the sheet. The sheet was placed, non-planar surface down, onto a flat CVD polyD film (about 0.3 mm thick) on an $Al_2O_3$ substrate. A Mo sheet and a Al$_2$O$_3$ plate were placed between the Ce sheet and a dead weight, the weight providing compressive stress (about 10 psi, corresponding to about 6.9×10$^4$ Pa) to the combination. The assembly was maintained at about 730° C. (i.e., about 60° C. below the melting point of Ce) for one week in an Ar atmosphere, followed by cooling to room temperature. The above procedure, after removal of reacted and/or residual Ce by conventional acid etching, resulted in formation of a non-planar polyD surface that comprised two convex protruding features. The shape of the features corresponded substantially to the as-formed indentations in the Ce sheet.

EXAMPLE 2

In a Mn plate is formed, by a conventional method, an array of concave indentations (about 0.76 mm radius of curvature, about 0.38 mm deep). The resulting non-planar surface is placed onto the planar surface of an as-received CVD polyD film. Intimate contact is attained by means of a dead weight (corresponding to about 100 psi or about 6.9×10$^5$ Pa). The assembly is maintained for about 100 hours at about 900° C. in Ar. After cooling to room temperature, residual Mn is removed by acid etching. The resulting non-planar polyD surface comprises an array of convex protruding features that substantially are replicas of the indentations in the Mn plate. The non-planar polyD surface is further smoothed by laser planing and mechanical polishing with diamond lapping powder. The thus treated polyD film comprises an array of microlenses.

We claim:

1. Method of making an article that comprises a shaped diamond body, the method comprising:

a) providing a precursor diamond body having a substantially planar surface;

b) forming the shaped diamond body from the precursor body by a process that comprises removing diamond material from the precursor body by contacting said surface of the precursor body with a hot template, said template having weight; and c) carrying out one or more further steps towards completion of the article;

characterized in that d) the precursor body is a polycrystalline diamond body;

e) the template comprises a template body that comprises a metal selected from the group consisting of the rare earth metals, Mn and Fe, has a nonplanar surface that comprises a first feature and, during step b), is at a temperature below the melting temperature of said template body; and f) step b) comprises maintaining the template body in intimate contact with at least a portion of said surface of the precursor body for a time effective for transforming said substantially planar surface of the precursor body into a nonplanar surface that comprises a second feature that substantially is a replica of said first feature, said intimate contact between the polycrystalline diamond body and the template resulting from urging together the polycrystalline diamond body and the template by means of an applied force, said applied force being a force other than the force due to the weight of the template.

2. Method of claim 1, wherein the temperature is at least 20° C. below the melting temperature, and the template body is in intimate contact with the said surface for a period in the range 1–1000 hours.

3. Method of claim 1, wherein the template body comprises at least 50 atomic percent of a metal selected from the group consisting of La, Ce, Mn and Fe.

4. Method of claim 1, wherein said first feature is selected such that said second feature has a lateral dimension that is at least 100 μm.

5. Method of claim 4, wherein said template body comprises a multiplicity of first features.

6. Method of claim 1, wherein the metal is selected from the group consisting of the rare earth metals.

* * * * *